(12) United States Patent
Nagineni

(10) Patent No.: US 8,880,793 B2
(45) Date of Patent: Nov. 4, 2014

(54) STORAGE MANAGEMENT SYSTEMS AND METHODS

(75) Inventor: Venkata Sreenivasarao Nagineni, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 308 days.

(21) Appl. No.: 13/083,351

(22) Filed: Apr. 8, 2011

(65) Prior Publication Data

US 2012/0260036 A1  Oct. 11, 2012

(51) Int. Cl.
*G06F 13/00* (2006.01)
*G06F 13/28* (2006.01)
*H04L 29/08* (2006.01)

(52) U.S. Cl.
CPC ................................ *H04L 67/1097* (2013.01)
USPC .................... 711/111; 711/E12.002; 707/821

(58) Field of Classification Search
USPC ........................... 711/111, E12.002; 707/821
See application file for complete search history.

(56) References Cited

U.S. PATENT DOCUMENTS 6,647,393 B1 * 11/2003 Dietterich et al. ....... 379/218.01
8,271,725 B1 *  9/2012 Vemuri et al. ................ 711/114

2004/0010563 A1 *  1/2004 Forte et al. ................... 709/215
2006/0026263 A1 *  2/2006 Raghavan et al. ............ 709/217
2008/0043973 A1 *  2/2008 Lai et al. .................. 379/218.01
2012/0203876 A1 *  8/2012 Finnegan et al. ............. 709/220

OTHER PUBLICATIONS

"LUN management at heart of San configuration", ComputerWeekly.com, Jun. 8, 2007.*

* cited by examiner

*Primary Examiner* — Edward Dudek, Jr.
(74) *Attorney, Agent, or Firm* — Wilmer Cutler Pickering Hale and Dorr LLP

(57) ABSTRACT

Storage management systems and methods are presented. In one embodiment, a storage management method comprises: establishing a cluster including one or more logical unit number storage components (LUNs) communicatively coupled to one or more host nodes, wherein one of the one or more nodes is a master host node; performing a LUN naming process wherein a master host node assigns a name to each of the one or more LUNs respectively, even if the one or more LUNS are communicatively coupled to a slave host node; and operating the cluster, wherein the one or more host nodes refer to the one or more LUNs by the name. In one embodiment, the master host node stores information associated with the name in a computer readable medium. The cluster can include one or more slave host nodes.

17 Claims, 10 Drawing Sheets

300

310
Establishing a cluster including one or more logical unit number storage components (LUNs) communicatively coupled to one or more host nodes.

320
Performing a LUN naming process wherein a name is assigned to each of the one or more LUNs respectively.

330
Operating the cluster, wherein the one or more host nodes refer to the one or more LUNs by the respective name.

410
Gathering information regarding the one or more LUNs,.

420
Checking if a LUN has already been assigned a name.

430
Assigning a name to each of the one or more LUNs if a name has not already been assigned.

440
Forwarding information associated with a name assigned to a LUN to one or more host nodes

| | LUN Serial Number | Enclosure Serial Number |
|---|---|---|
| ABC | 53782245TFC3452WWR3424 | 782TDBE992274KBGT |
| XYZ | 342GRFC887NBX4348VK44 | JFC25544FRSC4428871 |
| | | |
| | | |

STORAGE MANAGEMENT SYSTEMS AND METHODS

FIELD OF THE INVENTION

The present embodiments relate to the field of cluster storage support and management, including naming and tracking names and indicators of logical unit number storage components (LUNs).

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety of reasons (e.g., disaster recovery, corruption correction, system maintenance, etc.). Various resources organized in a variety of architectures or hierarchies are often relied upon to support and manage storage of data. Managing naming of the resources can be complex and complicated.

Storage resources can be organized in a cluster hierarchy with multiple host nodes. The host nodes can use logical unit number storage resources (LUNs) for storing information. Each host or server can have a different name for each LUN. In a traditional approach in which the same LUNs are exported to multiple servers, if a cluster volume manager is configured across the multiple servers, the LUNs will get different names. FIG. 1 is a block diagram of an exemplary traditional system 100. System 100 includes host node 101, host node 102, and disk array 120 which includes LUNs 121 and 122. Host node 101 refers to LUN 121 as ABC123XYZ345JT3325 and host node 102 refers to LUN 121 as LMN523KJ73348RT7784. Conventional approaches in which a host node can refer to the same LUN by different names can be problematic because if any cluster of hosts is configured where the nodes share the same storage, it can be difficult to figure out that two different names are the same LUN.

Some conventional approaches attempt to use an array volume identification (AVID) based naming scheme, but this approach may also be problematic. This is an additional property to be returned by the array and this is often not supported by many tier 1 class array configurations. Even if support is attempted, the conventional approaches make an assumption that the same set of enclosures are connected across hosts in the cluster. However, if there is a host which is not seeing the same set of enclosures then the names generated on that host are not typically consistent with the other hosts. In addition, even if multiple host nodes coincidentally utilize the same name, conventionally naming schemes typically include numerous bits and are very long making tracking and management of the names difficult.

SUMMARY

Storage management systems and methods are presented. In one embodiment, a storage management method comprises: establishing a cluster including one or more logical unit number storage components (LUNs) communicatively coupled to one or more host nodes, wherein one of the one or more nodes is a master host node; performing a LUN naming process wherein a master host node assigns a name to each of the one or more LUNs respectively, even if the one or more LUNs are communicatively coupled to a slave host node; and operating the cluster, wherein the one or more host nodes refer to the one or more LUNs by the name. In one embodiment, the master host node stores information associated with the name in a computer readable medium. The cluster can include one or more slave host nodes.

In one embodiment, the LUN naming process comprises: gathering information regarding the one or more LUNs, including information indicating to the master host node if the one or more slave host nodes are communicatively coupled to the one or more LUNs; checking if the master host node has performed a LUN naming process for the one or more LUNs communicatively coupled to the one or more slave nodes; assigning the name to each of the one or more LUNs respectively if the master host node has not already assigned the name respectively to each of the one or more LUNs communicatively coupled to one or more of the slave host nodes; and forwarding information associated with the name to the one or more slave host nodes. In one exemplary implementation, the indicating to the master host node if the one or more slave host nodes are communicatively coupled to the one or more LUNs includes forwarding a corresponding LUN number and a corresponding cabinet serial number. The information associated with the name can be configured in a data structure format that includes a correspondence between the assigned name and the corresponding LUN number and a corresponding cabinet serial number. In one embodiment, the LUN naming process includes assigning the name in accordance with a cluster consistent enclosure basis.

In one embodiment, a reprogrammable tangible computer readable medium having stored thereon, computer executable instructions that when executed by a computer system cause the computer system to perform a method comprising: establishing a cluster including one or more logical unit number storage components (LUNs) communicatively coupled to one or more host nodes, wherein one of the one or more nodes is a master host node; performing a LUN naming process wherein a master host node assigns a name to each of the one or more LUNs respectively, even if the one or more LUNS are communicatively coupled to a slave host node; and operating the cluster, wherein the one or more host nodes refer to the one or more LUNs by the name. In one embodiment, the master host node stores information associated with the name in a computer readable medium. The cluster can include one or more slave host nodes.

In one embodiment, the LUN naming process comprises: gathering information regarding the one or more LUNs, including information indicating to the master host node if the one or more slave host nodes are communicatively coupled to the one or more LUNs; checking if the master host node has performed a LUN naming process for the one or more LUNs communicatively coupled to the one or more slave nodes; assigning the name to each of the one or more LUNs respectively if the master host node has not already assigned the name respectively to each of the one or more LUNs communicatively coupled to one or more of the slave host nodes; and forwarding information associated with the name to the one or more slave host nodes. In one exemplary implementation, the indicating to the master host node if the one or more slave host nodes are communicatively coupled to the one or more LUNs includes forwarding a corresponding LUN number and a corresponding cabinet serial number. The information associated with the name can be configured in a data structure format that includes a correspondence between the assigned name and the corresponding LUN number and a corresponding cabinet serial number. In one embodiment, the LUN naming process includes assigning the name in accordance with a cluster consistent enclosure basis.

In one embodiment, a computer system comprising: a processor coupled to a computer readable storage media and executing computer readable code which causes the computer system to perform operations including: establishing a cluster including one or more logical unit number storage components (LUNs) communicatively coupled to one or more host nodes, wherein one of the one or more nodes is a master host node; performing a LUN naming process wherein a master host node assigns a name to each of the one or more LUNs respectively, even if the one or more LUNS are communicatively coupled to a slave host node; and operating the cluster, wherein the one or more host nodes refer to the one or more LUNs by the name. In one embodiment, the master host node stores information associated with the name in a computer readable medium. The cluster can include one or more slave host nodes.

In one embodiment, the LUN naming process comprises: gathering information regarding the one or more LUNs, including information indicating to the master host node if the one or more slave host nodes are communicatively coupled to the one or more LUNs; checking if the master host node has performed a LUN naming process for the one or more LUNs communicatively coupled to the one or more slave nodes; assigning the name to each of the one or more LUNs respectively if the master host node has not already assigned the name respectively to each of the one or more LUNs communicatively coupled to one or more of the slave host nodes; and forwarding information associated with the name to the one or more slave host nodes. In one exemplary implementation, the indicating to the master host node if the one or more slave host nodes are communicatively coupled to the one or more LUNs includes forwarding a corresponding LUN number and a corresponding cabinet serial number. The information associated with the name can be configured in a data structure format that includes a correspondence between the assigned name and the corresponding LUN number and a corresponding cabinet serial number. In one embodiment, the LUN naming process includes assigning the name in accordance with a cluster consistent enclosure basis.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 3 is a block diagram of an exemplary storage management method in accordance with one embodiment of the present invention.

FIG. 4 is a block diagram of an exemplary LUN naming process in accordance with one embodiment of the present invention.

FIG. 5 is a block diagram of an exemplary LUN naming data structure in accordance with one embodiment of the present invention.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods are presented that facilitate efficient and effective storage resource management. In one embodiment, the present systems and methods help manage and track names or identifiers for logical unit number (LUN) storage components. In one exemplary implementation, the LUN naming process includes assigning the name in accordance with a cluster consistent enclosure basis. Unlike conventional approaches that may include multiple different names for the same LUN, the systems and methods described in the detailed description facilitate consistent names for each respective LUN associated with a cluster. In one embodiment, there are consistent device names assigned to a LUN across cluster volume manager configure hosts. In one embodiment, a master host node creates names for each LUN, even LUNs associated with slave host nodes. Additional description of LUN naming support and tracking is set forth in following sections of the detailed description.

Figure 1:
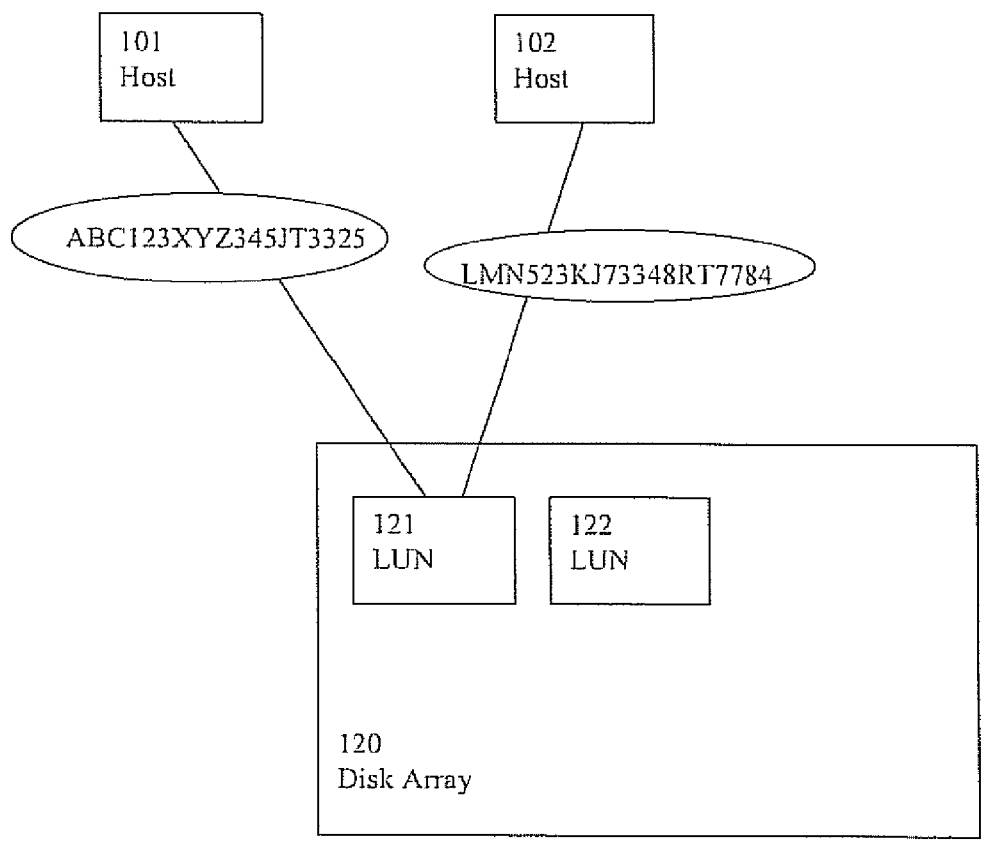
FIG. 1 is a block diagram of an exemplary traditional system.
Figure 2:
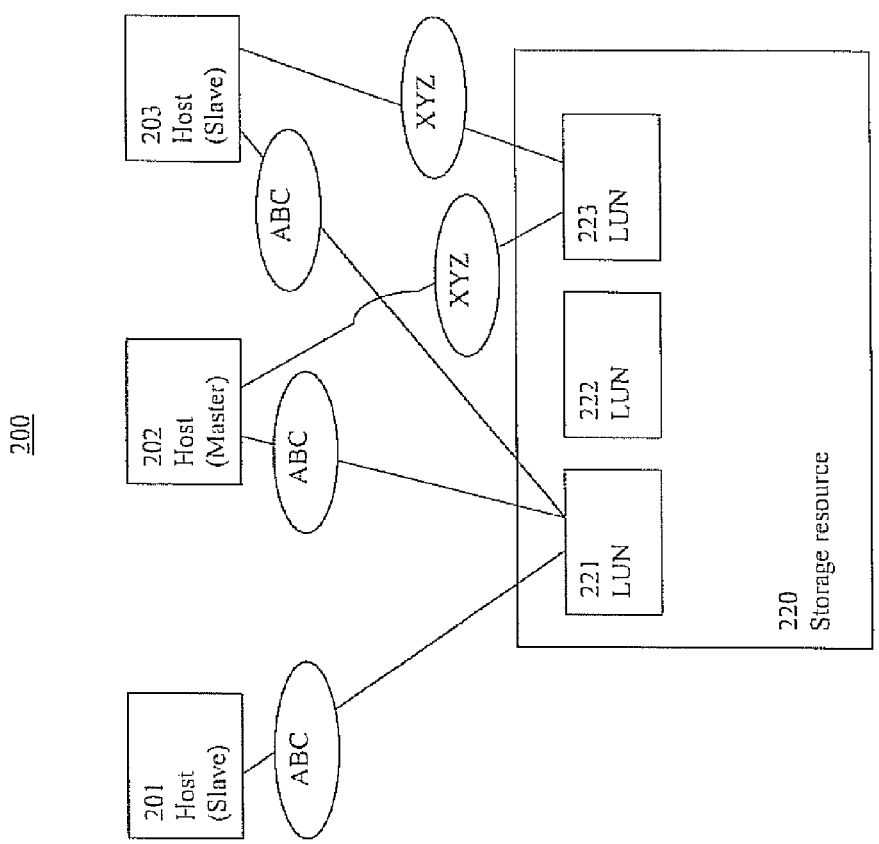
FIG. 2 is a block diagram of an exemplary cluster system in accordance with one embodiment of the present invention.

FIG. 2 is a block diagram of exemplary cluster system 200 in accordance with one embodiment of the present invention. Cluster system 200 includes host node 201, host node 202, host node 203, and storage resource 220. Storage resource 220 includes logical unit number storage component (LUN) 221, logical unit number storage component (LUN) 222 and logical unit number storage component (LUN) 223. Host node 201 is communicatively coupled to storage resource 220 including logical unit number storage component (LUN) 221. Host node 202 is communicatively coupled to storage resource 220 including logical unit number storage component (LUN) 221. Host node 203 is communicatively coupled to storage resource 220 including logical unit number storage component (LUN) 221.

The components of cluster system 200 cooperatively operate to store information. Storage resource 220 includes a storage media for storing information. It is appreciated that storage resource 220 can include various storage media (e.g., disk arrays, hard disks, flash drives, RAM, etc.). The storage resources or components of storage resource 220 can be organized in a logical unit number storage component (LUN) configuration. In one embodiment, a logical unit number storage component (LUN) is a logical or virtual grouping of storage resources. While the present embodiment shows each LUN within storage resource 220, it is appreciated that storage component of a LUN can span or be partially located in multiple storage resources. Host nodes 201, 202 and 203 manage and direct storage of information in the various LUNs including LUNs 221, 222 and 223. Host nodes 201, 202 and 203 use a common name or identifier for each of the respective LUNS. In one exemplary implementation, the host nodes 221, 222 and 223 refer to LUN 221 as ABC and LUN 223 as XYZ. In one exemplary implementation, host node 202 is a master host node and creates the names or identifiers ABC and XYZ and informs the other slave host nodes 201 and 203.

FIG. 3 is a block diagram of exemplary storage management method 300 in accordance with one embodiment of the present invention.

In block 310, a cluster is established including one or more logical unit number storage components (LUNs) communicatively coupled to one or more host nodes. In one embodiment, one of the one or more nodes is a master host node. The cluster can also include one or more slave host nodes.

In block 320, a LUN naming process is performed. In one embodiment, a master host node assigns a name to each of the one or more LUNs respectively. The master assigns the name even if the one or more LUNS are communicatively coupled to a slave host node. In one embodiment, the LUN naming process includes assigning the name in accordance with a cluster consistent enclosure basis. In one exemplary implementation, master host node 202 assigns a name ABC to LUN 221 and a name XYZ to LUN 223. In one embodiment, the master host node stores information associated with the name in a computer readable medium. Additional information on a LUN naming process is described in following sections of the detailed description.

In block 330, cluster operations are performed. In one embodiment, the one or more host nodes refer to the one or more LUNs by the name. In one exemplary implementation, host nodes 201,202 and 203 refer to LUN 221 as ABC and LUN 223 as XYZ.

FIG. 4 is a block diagram of exemplary LUN naming process 400 in accordance with one embodiment of the present invention. In one embodiment, LUN naming process 400 is similar to the LUN naming process of block 320.

In block 410, information is gathered regarding the one or more LUNs. In one embodiment, information includes LUNs that are communicatively coupled to the master. In one exemplary implementation, the information includes a corresponding LUN number and a corresponding cabinet serial number. The information can also include information indicating to the master host node if the one or more slave host nodes are communicatively coupled to the one or more LUNs. In one embodiment, indicating to the master host node if the one or more slave host nodes are communicatively coupled to the one or more LUNs includes forwarding a corresponding LUN number and a corresponding cabinet serial number.

In block 420, a check is performed to determine if a LUN has already been assigned a name. In one embodiment, a check is performed to determine if a master host node has performed a LUN naming process for the one or more LUNs communicatively coupled to the one or more slave nodes.

In block 430, a name is assigned to each of the one or more LUNs if a name has not already been assigned. In one embodiment, a name is assigned if the master host node has not already assigned a name respectively to each of the one or more LUNs communicatively coupled to one or more of the slave host nodes.

In block 440, information associated with a name assigned to a LUN is forwarded to one or more host nodes. In one embodiment, information associated with a LUN name is forwarded to the one or more slave host nodes. In exemplary implementation, the slave host nodes can store received information associated with the LUN name in a computer readable medium.

In one embodiment, the information associated with the name is configured in a data structure format that includes a correspondence between the assigned name and the corresponding LUN number and a corresponding cabinet serial number. FIG. 5 is a block diagram of an exemplary LUN naming data structure 500 in accordance with one embodiment of the present invention. LUN naming data structure 500 includes a column for the name assigned to a LUN, a column for a LUN serial number and a column for an enclosure number. For example, name ABC is included in the name column and both the corresponding 53782245TFC3452WWR3424 is included in the LUN Serial Number column and 782TDBE992274KBGT is included in the Enclosure Serial Number column. It is appreciated that the LUN serial number and enclosure serial number can include more digits and be more complicated.

Figure 6:
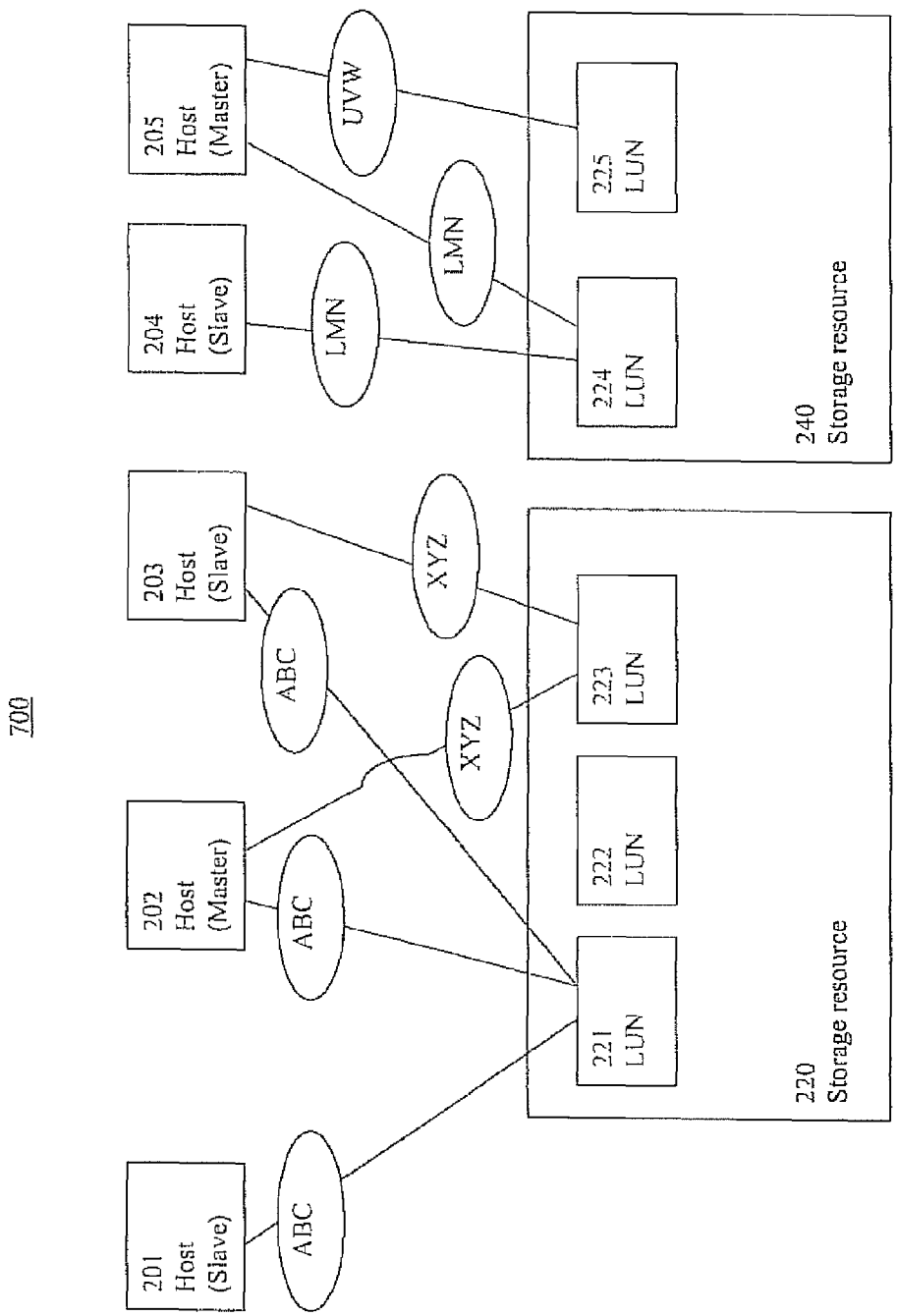
FIG. 6 is a block diagram of an exemplary cluster system in accordance with one embodiment of the present invention.
Figure 7:
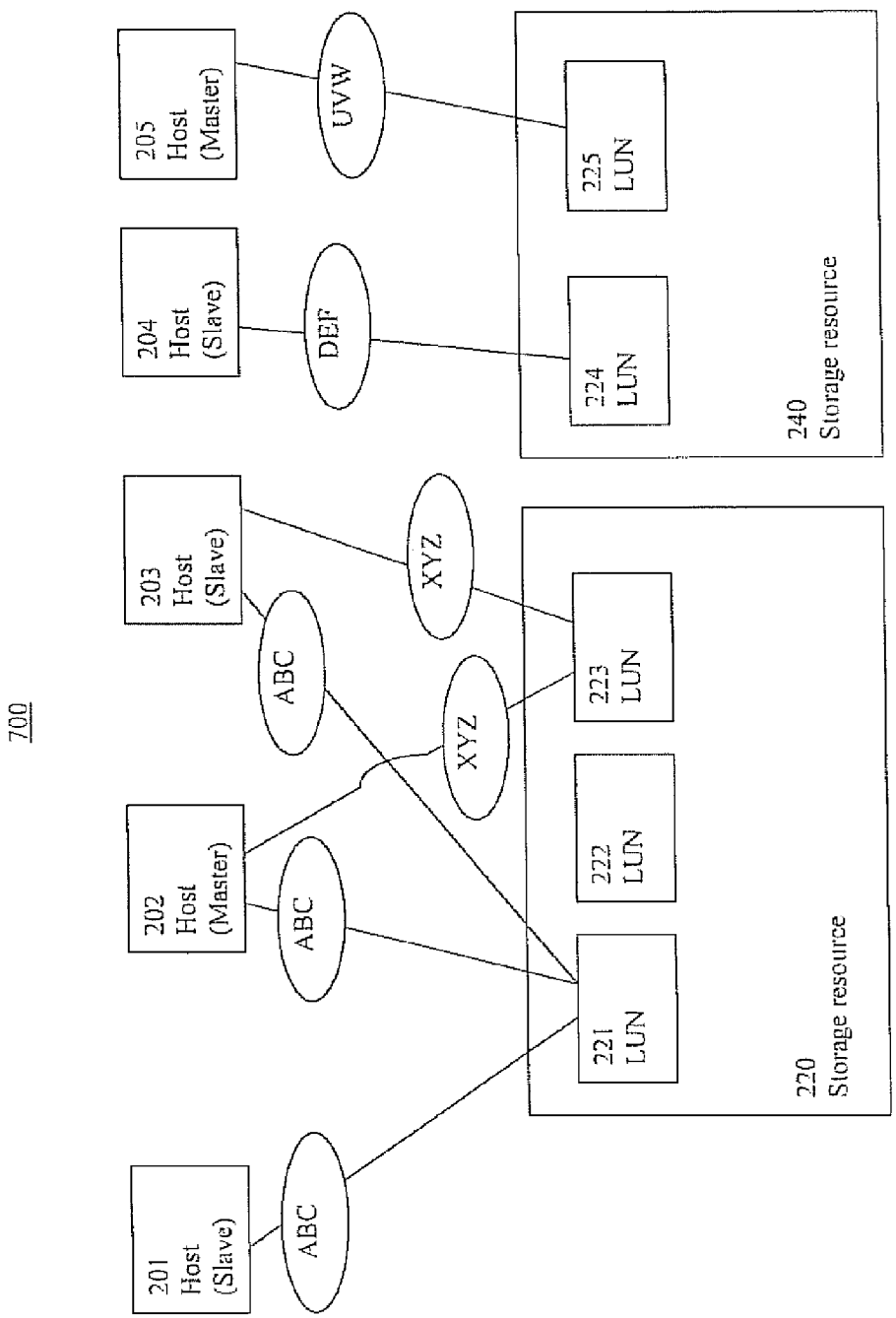
FIG. 7 is a block diagram of an exemplary cluster system after a new node joins a cluster in accordance with one embodiment of the present invention.

FIG. 6 is a block diagram of exemplary cluster system 700 in accordance with one embodiment of the present invention. Cluster system 700 is similar to cluster system 200 except cluster system 700 has an additional second cluster which includes host node 204, host node 205 and storage resource 240 which includes LUN 224 and LUN 225. In one embodiment, master host node 205 gives the name UVW to LUN 225 and the name LMN to LUN 224. Master host node 205 also forwards the names to slave host node 204 and slave host node 204 uses the names provided by master host node 205 to refer to the LUNs. In one exemplary implementation, slave host node 204 uses the name LMN to refer to the LUN 224 while slave host node 204 belongs to the second cluster (e.g., the same cluster as master node 205). If slave host node 204 leaves the second cluster and joins another cluster then slave host node 204 receives names that are used in that cluster to refer to the LUNs. FIG. 7 is a block diagram of exemplary cluster system 700 after a new node joins a cluster in accordance with one embodiment of the present invention. In one embodiment, slave host node 204 leaves the second cluster (e.g., the same cluster as master node 205) and joins the first cluster (e.g., the same cluster as master node 202). Slave node 204 informs the master node 202 which LUNs that slave node 204 are communicatively coupled to (e.g., LUN 224). Master host node 202 renames the LUN 224 as DEF and informs the slave host node 204 of the name. Slave host node 204 now refers to the LUN 224 by the name DEF.

Figure 8:
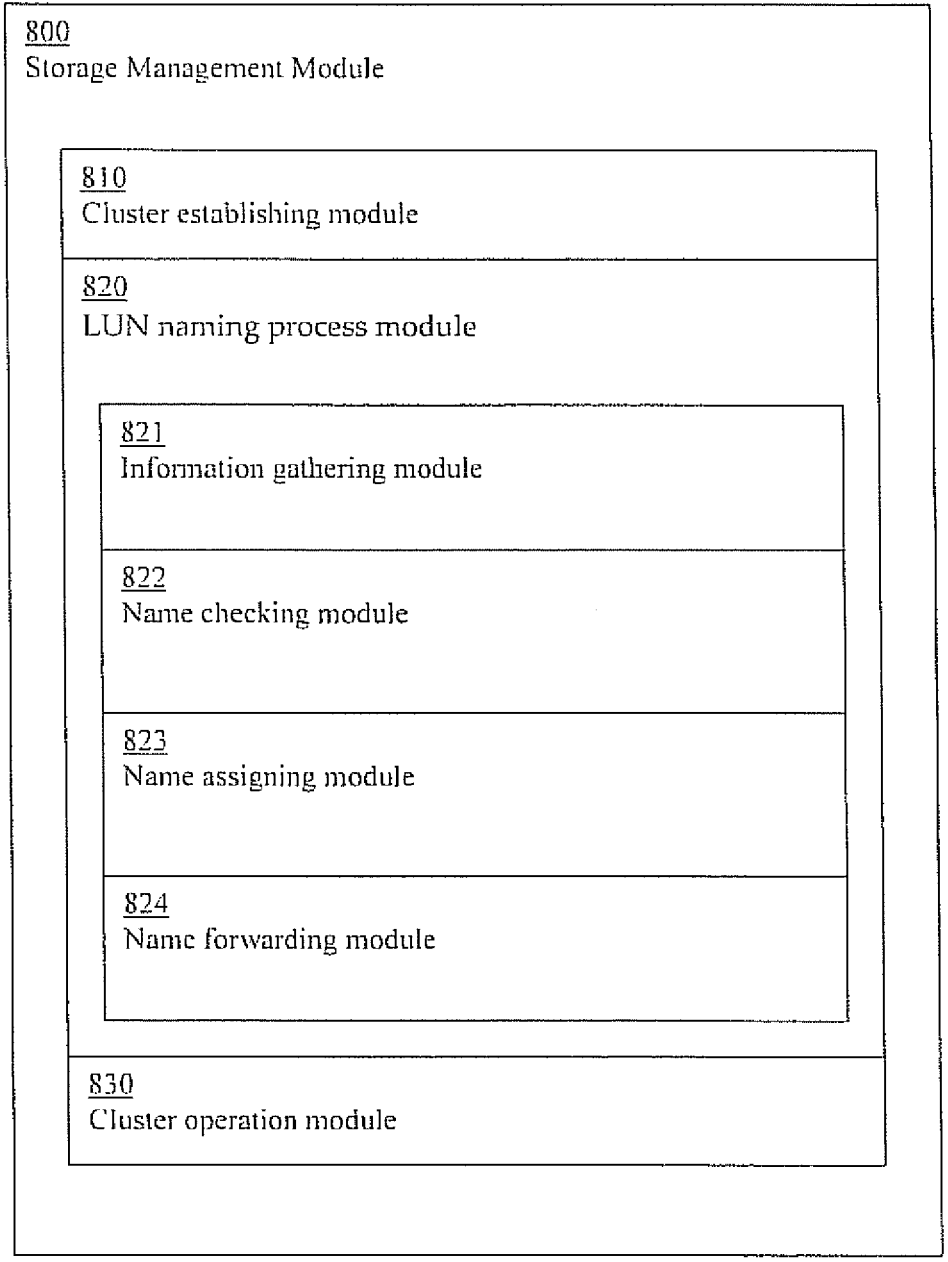
FIG. 8 is a block diagram of an exemplary storage management module which includes instructions for directing a processor in the performance of storage management in accordance with one embodiment of the present invention.

FIG. 8 is a block diagram of exemplary storage management module 800 which includes instructions for directing a processor in the performance of a storage management method (e.g., storage management method 300, etc.) in accordance with one embodiment of the present invention. Storage management module 800 includes cluster establishing module 810, LUN naming process module 820, and cluster operation module 830. Establishing module 810 includes instructions for performing cluster establishment. In one embodiment, establishing module 810 includes instructions for performing cluster establishing operations as indicated in block 310. LUN naming module 820 includes instructions for performing LUN naming. In one embodiment, LUN naming module 820 includes instructions for performing LUN naming operations as indicated in block 320. Cluster operation module 830 includes instructions for performing cluster operations. In one embodiment, cluster operation module 830 includes instructions for performing cluster operations as indicated in block 330.

In one embodiment, LUN naming process module 820 includes information gathering module 821, name checking module 822, name assigning module 823 and name forwarding module 824. Information gathering module 821 includes instructions for gathering information. In one embodiment, information gathering module 821 includes instructions for performing gathering information operations as indicated in block 410. Name checking module 822 includes instructions for performing name checking. In one embodiment, name checking module 822 includes instructions for performing name checking operations as indicated in block 420. Name assigning module 823 includes instructions for performing name assigning. In one embodiment, name assigning module 823 includes instructions for performing name assigning operations as indicated in block 430. Name forwarding module 824 includes instructions for performing name forwarding. In one embodiment, name forwarding module 824 includes instructions for performing name forwarding operations as indicated in block 310.

Figure 9:
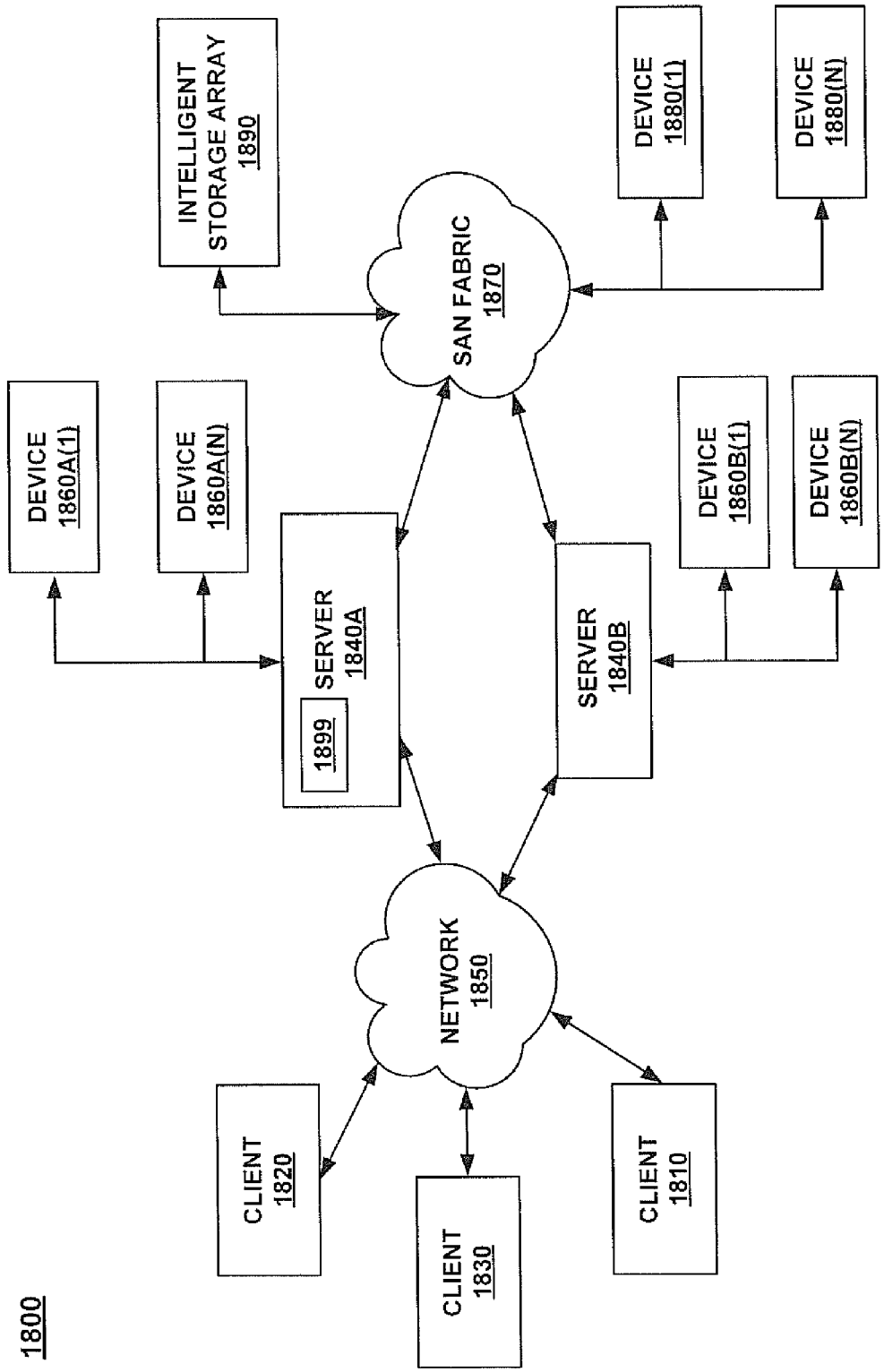
FIG. 9 is a block diagram depicting an exemplary network architecture in accordance with one embodiment of the present invention.

It is appreciated present storage management systems and methods can be implemented as part of a variety of environments. For example, storage management systems and methods can be implemented as part of a distributed computing environment, a cloud computing environment, a virtual environment, a client server environment, etc. In one embodiment, storage management method (e.g., storage management method 300, etc.) can be implemented on a network. FIG. 9 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes management module 1899. In one embodiment, a management module 1899 is similar to management module 800. It is appreciated that present systems and methods are compatible with a variety of implementations. For example, portions of information and instructions associated with can be distributed in various resources.

Figure 10:
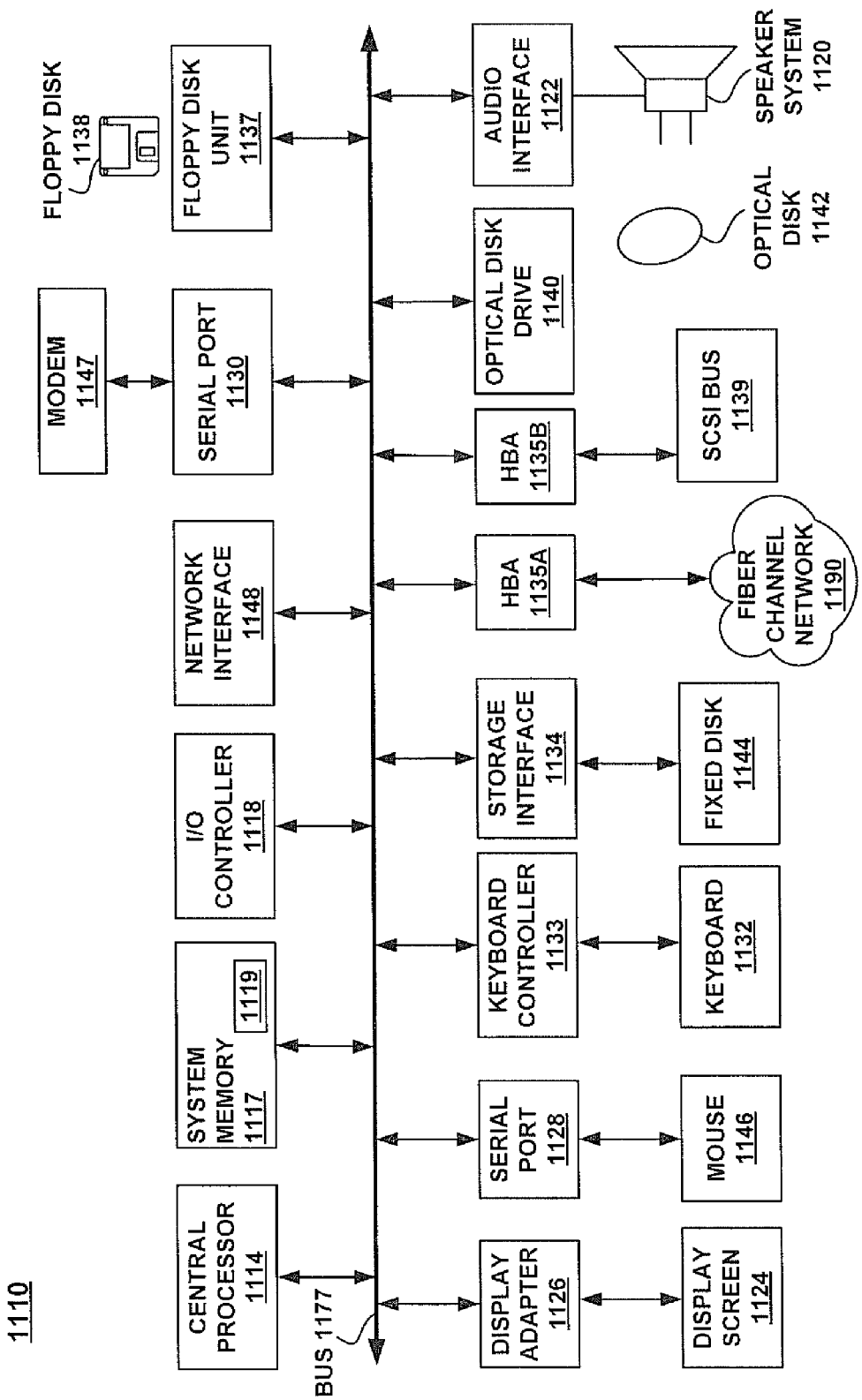
FIG. 10 depicts a block diagram of an exemplary computer system in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a management method (e.g., similar management method 300, etc.) are stored in one or more memories of computer system 1100 (e.g., in memory location 1119). The RAM is generally the main memory into which the operating system and application programs are loaded. In one embodiment, RAM 1117 includes an storage management module (e.g., in memory location 1119). In one embodiment, an storage management module stored in memory location 1119 is similar to storage management module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 9 depicts the use of a network such as the Internet for exchanging data, but the present disclosure is not limited to the Internet or any particular network-based environment.

Thus, the present systems and methods facilitate efficient and effective storage resource management. Unlike conventional attempts that can have different names or indicators for the same LUN, the approaches described in the present detailed description facilitate uniform names or indicators for the same LUN. In addition, approaches described in the present detailed description facilitate convenient naming conventions.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A storage management method comprising;
establishing a cluster including one or more logical unit number storage components (LUNs) communicatively coupled to a plurality of host nodes including a master host node and one or more slave host nodes, each of said plurality of host nodes including a data structure associated with the host node that associates each of at least one LUN number of the one or more LUNs with an assigned name;

performing a LUN naming process wherein:
- the master host node assigns a name to each of said one or more LUNs respectively, the process of assigning each name including updating the data structure associated with the master host node to associate each assigned name with the LUN number of the respective LUN,
- for a first LUN of said one or more LUNS that is communicatively coupled to a first slave host node of said one or more slave host nodes, the master host node forwards the name assigned to said first LUN to said first slave host node, and
- said first slave host node updates the data structure associated with said first slave node to associate said name assigned to said first LUN with said LUN number of said first LUN; and operating said cluster, wherein said first slave host node refers to said first LUN by said assigned name based on said assigned name being associated with said LUN number of said first LUN in said data structure associated with said first slave node.

2. The storage management method of claim 1 wherein said data structure associated with said master host node is stored in a computer readable medium.

3. The storage management method of claim 1 wherein said LUN naming process comprises, for each LUN of said one or more LUNs:
- gathering information indicating which of said one or more slave host nodes are communicatively coupled to said LUN;
- checking if said master host node has performed a LUN naming process for said LUN;
- if said master host node has not already assigned a name to said LUN, assigning a name to said LUN by updating said data structure associated with said master host node to associate said name with the LUN number of said LUN; and
- forwarding information associated with said name assigned to said LUN to each of said one or more slave host nodes communicatively coupled to said LUN.

4. The storage management method of claim 3 wherein said gathering information includes forwarding to said master host node a corresponding LUN number and a corresponding cabinet serial number.

5. The storage management method of claim 4 wherein said information associated with said name is configured in said data structure associated with said master host node that includes a correspondence between said assigned name and said corresponding LUN number and said corresponding cabinet serial number.

6. The storage management method of claim 1 wherein said LUN naming process includes assigning said name in accordance with a cluster consistent enclosure basis.

7. A non-transitory computer readable medium having stored thereon, computer executable instructions that when executed by a computer system cause the computer system to perform a method comprising:
- establishing a cluster including one or more logical unit number storage components (LUNs) communicatively coupled to a plurality of host nodes including a master host node and one or more slave host nodes, each of said plurality of host nodes including a data structure associated with the host node that associates each of at least one LUN number of the one or more LUNs with an assigned name;

performing a LUN naming process wherein:
- the master host node assigns a name to each of said one or more LUNs respectively, the process of assigning each name including updating the data structure associated with the master host node to associate each assigned name with the LUN number of the respective LUN,
- for a first LUN of said one or more LUNS that is communicatively coupled to a first slave host node of said one or more slave host nodes, the master host node forwards the name assigned to said first LUN to said first slave host node, and
- said first slave host node updates the data structure associated with said first slave node to associate said name assigned to said first LUN with said LUN number of said first LUN; and operating said cluster, wherein said first slave host node refers to said first LUN by said assigned name based on said assigned name being associated with said LUN number of said first LUN in said data structure associated with said first slave node.

8. The non-transitory computer readable medium of claim 7 wherein said data structure associated with said master host node is stored in a computer readable medium.

9. The non-transitory computer readable medium of claim 7 wherein said LUN naming process comprises, for each LUN of said one or more LUNs:
- gathering information indicating which of said one or more slave host nodes are communicatively coupled to said LUN;
- checking if said master host node has performed a LUN naming process for said LUN;
- if said master host node has not already assigned a name to said LUN, assigning a name to said LUN by updating said data structure associated with said master host node to associate said name with the LUN number of said LUN; and
- forwarding information associated with said name assigned to said LUN to each of said one or more slave host nodes communicatively coupled to said LUN.

10. The non-transitory computer readable medium of claim 9 wherein said gathering information includes forwarding to said master host node a corresponding LUN number and a corresponding cabinet serial number.

11. The non-transitory computer readable medium of claim 10 wherein said information associated with said name is configured in said data structure associated with said master host node that includes a correspondence between said assigned name and said corresponding LUN number and said corresponding cabinet serial number.

12. The non-transitory computer readable medium of claim 7 wherein said LUN naming process includes assigning said name in accordance with a cluster consistent enclosure basis.

13. A computer system comprising:
- a processor coupled to a computer readable storage media and executing computer readable code which causes the computer system to perform operations including:
  - establishing a cluster including one or more logical unit number storage components (LUNs) communicatively coupled to a plurality of host nodes including a master host node and one or more slave host nodes, each of said plurality of host nodes including a data structure associated with the host node that associates each of at least one LUN number of the one or more LUNs with an assigned name;

performing a LUN naming process wherein:
- the master host node assigns a name to each of said one or more LUNs respectively, the process of assigning each name including updating the data structure associated with the master host node to associate each assigned name with the LUN number of the respective LUN,
- for a first LUN of said one or more LUNS that is communicatively coupled to a first slave host node of said one or more slave host nodes, the master host node forwards the name assigned to said first LUN to said first slave host node, and
- said first slave host node updates the data structure associated with said first slave node to associate said name assigned to said first LUN with said LUN number of said first LUN; and
- operating said cluster, wherein said first slave host node refers to said first LUN by said assigned name based on said assigned name being associated with said LUN number of said first LUN in said data structure associated with said first slave node.

14. The computer system of claim 13 wherein said data structure associated with said master host node is stored in a computer readable medium.

15. The computer system of claim 13 wherein said LUN naming process comprises, for each LUN of said one or more LUNs:
- gathering information indicating which of said one or more slave host nodes are communicatively coupled to said LUN;
- checking if said master host node has performed a LUN naming process for said LUN;
- if said master host node has not already assigned a name to said LUN, assigning a name to said LUN by updating said data structure associated with said master host node to associate said name with the LUN number of said LUN; and
- forwarding information associated with said name assigned to said LUN to each of said one or more slave host nodes communicatively coupled to said LUN.

16. The computer system of claim 15 wherein said gathering information includes forwarding to said master host node a corresponding LUN number and a corresponding cabinet serial number.

17. The computer system of claim 13 wherein said LUN naming process includes assigning said name in accordance with a cluster consistent enclosure basis.

* * * * *